(12) United States Patent  
Kong

(10) Patent No.: US 8,389,169 B2
(45) Date of Patent: Mar. 5, 2013

(54) HYDROGEN GENERATOR AND FUEL CELL SYSTEM WITH THE SAME

(75) Inventor: Sang-Jun Kong, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1384 days.

(21) Appl. No.: 12/076,217

(22) Filed: Mar. 14, 2008

(65) Prior Publication Data

US 2009/0011294 A1 Jan. 8, 2009

(30) Foreign Application Priority Data

Jul. 3, 2007 (KR) .................. 10-2007-0066517

(51) Int. Cl.
*H01M 8/06* (2006.01)
*C01B 3/02* (2006.01)
*B01J 7/00* (2006.01)

(52) U.S. Cl. ............... 429/421; 429/416; 423/648.1; 48/61

(58) Field of Classification Search ................ 429/408, 429/416–417, 421, 426; 48/61; 423/644–658.3; 420/900

See application file for complete search history.

(56) References Cited

U.S. PATENT DOCUMENTS

| 5,634,341 | A | 6/1997 | Klanchar et al. |
| 6,461,752 | B1 * | 10/2002 | Leung ............... 429/421 |
| 6,592,741 | B2 * | 7/2003 | Nakanishi et al. ......... 205/343 |
| 6,746,496 | B1 * | 6/2004 | Kravitz et al. ............ 48/118.5 |
| 2003/0009942 | A1 * | 1/2003 | Amendola et al. ........... 48/61 |
| 2003/0194368 | A1 * | 10/2003 | Devos et al. .............. 423/657 |
| 2003/0215680 | A1 * | 11/2003 | Lillis et al. .............. 429/21 |
| 2004/0121196 | A1 * | 6/2004 | Liu et al. ................. 429/12 |
| 2006/0014059 | A1 * | 1/2006 | Wood ..................... 429/14 |
| 2007/0259241 | A1 * | 11/2007 | Miyamoto et al. ........... 429/34 |

FOREIGN PATENT DOCUMENTS

WO WO 2005083826 A1 * 9/2005

* cited by examiner

*Primary Examiner* — Basia Ridley
*Assistant Examiner* — Jacob Buchanan
(74) *Attorney, Agent, or Firm* — Robert E. Bushnell, Esq.

(57) ABSTRACT

A hydrogen generator includes a water storage container for storing water, a reaction container for receiving a solid fuel that is a mixture of a complex metal hydride and catalysts, and a water supplying source that is connected between the water storage container and the reaction container to supply the water to the reaction container.

22 Claims, 6 Drawing Sheets

HYDROGEN GENERATOR AND FUEL CELL SYSTEM WITH THE SAME

CROSS-REFERENCE TO RELATED APPLICATION AND CLAIM OF PRIORITY

This application claims priority to and the benefit of Korean Patent Application No. 10-2007-0066517 filed in the Korean Intellectual Property Office on Jul. 3, 2007, the entire content of which is incorporated herein by reference.

BACKGROUND OF THE INVENTION (a) Field of the Invention

The present invention relates to a fuel cell system. More particularly, the present invention relates to a hydrogen generator that can generate hydrogen gas through a hydrolysis reaction of sodium borohydride ($NaBH_4$).

(b) Description of the Related Art

As is well known, a fuel cell is an electric generator that can generate electrical energy using a fuel and oxidizing gas.

Fuel cells may be classified into polymer electrolyte membrane fuel cells and direct oxidation membrane fuel cells. The polymer electrolyte membrane fuel cell is configured to generate electrical energy through an electrochemical reaction between hydrogen gas and an oxidizing gas supplied separately.

It is well known that hydrogen gas is generated by a chemical reaction. For example, a hydrolysis reaction of a fuel such as sodium borohydride ($NaBH_4$) has been widely used to generate the hydrogen gas.

A first conventional hydrogen generator for generating the hydrogen gas using the hydrolysis reaction of sodium borohydride ($NaBH_4$) has a structure where catalysts are added to a fuel solution that is a mixture of sodium borohydride and water. A second conventional hydrogen generator has a structure wherein the fuel and water are supplied into a reaction container in which the catalysts are received. A third conventional hydrogen generator has a structure wherein a catalytic solution is supplied into a reaction container in which solid sodium borohydride is received.

In the first conventional hydrogen generator, since the catalysts are added to a fuel solution that is a mixture of sodium borohydride and water, byproducts such as sodium metaborate ($NaBO_2$) having a relatively high viscosity are produced in the fuel solution. Therefore, the fuel utilization efficiency is lowered due to the byproducts. Further, it is difficult to control the hydrogen generation speed.

In the second and third conventional hydrogen generators, since the fuel and water are supplied into the reaction container in which the catalysts are received or the catalytic solution is supplied into the reaction container in which solid sodium borohydride is received, when the water discharged from the fuel cell is reused by being supplied to the reaction container, the concentration of the fuel or the concentration of the catalysts varies by the reused water as time passes.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention is to provide an improved hydrogen generator.

The present invention is to provide an improved fuel cell.

Exemplary embodiments of the present invention provide a fuel cartridge that can improve use of a fuel, effectively control an amount of hydrogen gas generated, and prevent concentration of fuel or concentration of catalysts from varying even when water discharged from a fuel cell is reused. Exemplary embodiments of the present invention also provide a hydrogen generator having the fuel cartridge and a method of generating the hydrogen using the hydrogen generator.

Exemplary embodiments of the present invention also provide a fuel cell system having the hydrogen generator.

In an exemplary embodiment of the present invention, a hydrogen generator includes a water storage container for storing water, a reaction container containing a solid fuel that is a mixture of a complex metal hydride and catalysts, and a water supplying source that is connected between the water storage container and the reaction container to supply the water to the reaction container.

The hydrolysis reaction between the complex metal hydride and the water may be accelerated by the catalysts.

The amount of hydrogen gas generated may vary in accordance with an amount of water supplied.

The reaction container may have a predetermined volume of receiving space, and the receiving space is divided into a plurality of cells communicating with each other. At this point, the cells may be defined by a mesh member provided with a plurality of pores. Further, the cells may be arranged in a multilayer structure.

The solid fuel may be received in the cells and provided in the form of pellets.

When the solid fuel is provided in the form of pellets, each of the pellets may include a spherical core, a coating layer formed of the complex metal hydride and coated on the spherical core, and catalysts dispersed on the coating layer.

The reaction container may be provided with a hydrogen gas outlet through which the hydrogen gas is discharged, and a byproduct outlet through which byproducts generated by the hydrolysis reaction are discharged.

The reaction container may include a byproduct storage unit that is connected to the byproduct outlet to store the byproducts discharged through the byproduct outlet.

The water storage container is provided in the form of a pouch. The water storage container may be a water cartridge.

The water storage container may be provided with a water outlet through which the water is discharged. The water outlet may be connected to the reaction container.

The water storage container may be provided with a water inlet through which the water is supplied. The water inlet may be connected to fuel cells that discharge moisture when consuming the hydrogen gas.

The water supplying source may include a pump that is connected to the water storage container to forcedly supply the water to the reaction container.

The water supplying source may be connected to the pump and include a sprayer for atomizing the water sprayed into the reaction container.

The complex metal hydride may be sodium borohydride ($NaBH_4$).

A main component of the byproduct may be sodium metaborate.

In another exemplary embodiment, a hydrogen generator comprising: a water storage container for storing water; a reaction container having a plurality of cells defined by a plurality of porous mesh members; and a water supplying source connected between the water storage container and the reaction container to supply the water to the reaction container, the water supplying source comprising a sprayer to spray the water into the reaction container.

The reaction container may include a mesh member for dividing an inner space of the reaction container into a plurality of independent cells, and the solid fuel is received in the cells.

The solid fuel may be provided in the form of pellets, and each of the pellets may include a spherical core, a coating layer formed of the complex metal hydride and coated on the spherical core, and catalysts dispersed on the coating layer.

The reaction container may be provided with a hydrogen gas outlet through which the hydrogen gas is discharged, a byproduct outlet through which byproducts generated by the hydrolysis reaction are discharged, and a byproduct storage unit that is connected to the byproduct outlet to store the byproducts discharged through the byproduct outlet.

In still another exemplary embodiment, a fuel cell system includes a hydrogen generator for generating hydrogen gas the hydrogen generator comprising: a water storage container for storing water; a reaction container having a plurality of cells defined by a plurality of porous mesh members, the reaction container containing a solid fuel comprising a reactant and catalysts; and a water supplying source connected between the water storage container and the reaction container to supply the water to the reaction container, the water supplying source comprising a sprayer to spray the water into the reaction container; at least one fuel cell generating electrical energy using the hydrogen gas and an oxidizing gas; and an oxidizing gas supplier supplying the oxidizing gas to said at least one fuel cell.

The fuel cell system may further include a condenser that is connected between the fuel cells and the water storage container to condense steam discharged from the fuel cells into water and supply the condensed water to the water storage container.

The reaction container may be provided in the form of a fuel cartridge.

The reaction container may include a mesh member dividing an inner space of the reaction container into a plurality of independent cells, and the solid fuel is provided in the form of a plurality of pellets that are received in the cells.

The water supplying source may include a sprayer.

In still yet another exemplary embodiment, a method of generating hydrogen gas used for a fuel cell includes preparing the above-described hydrogen generator, supplying water from the water supplying source to the reaction container using a water supplying source, and generating the hydrogen gas through a hydrolysis reaction between the complex metal hydride and the water.

The amount of hydrogen gas generated may be controlled by adjusting the amount of the water supplied.

The reaction container may maintain a temperature of 40-70° C. by the hydrolysis reaction.

Moisture discharged from the fuel cell may be supplied to the water storage container.

BRIEF DESCRIPTION OF THE DRAWINGS

The accompanying drawings are included to provide a further understanding of exemplary embodiments of the invention. The invention may, however, be embodied in many different forms and should not be construed as being limited to the accompanying drawings.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
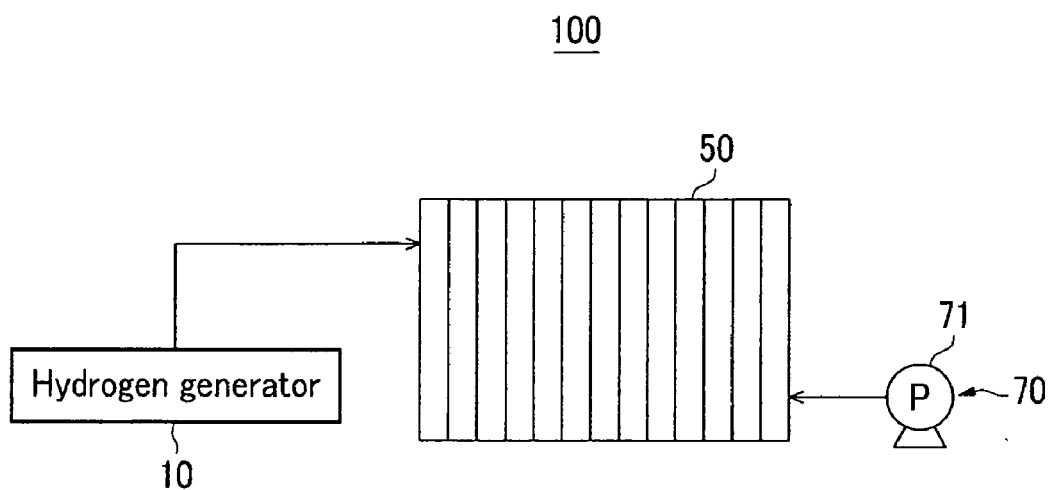
FIG. 1 is a schematic block diagram of a fuel cell system according to an exemplary embodiment of the present invention.

FIG. 1 is a schematic block diagram of a fuel cell system according to an exemplary embodiment of the present invention.

Referring to FIG. 1, a fuel cell system 100 of an exemplary embodiment of the present exemplary embodiment is configured to generate hydrogen gas containing no carbon monoxide through a chemical reaction of solid fuel and water and provide the generated hydrogen gas to fuel cells 50.

Each of the fuel cells 50 may be a polymer electrolyte membrane fuel cell that generates electrical energy through an electrochemical reaction between the hydrogen gas and oxidizing agent gas supplied separately.

The fuel cell system 100 may be constituted with a variety of units that can be built in a single housing (not shown) defining an outer appearance of the fuel cell system 100, or can be independently built in different housings (not shown). Each of the units is controlled by a controller (not shown).

The fuel cell system 100 includes a hydrogen generator 10 that generates hydrogen gas by accelerating a hydrolysis reaction between a complex metal hydride and water using a catalyst, and an oxidizing gas supplying unit 70 for supplying an oxidizing gas to the fuel cells 50.

The hydrogen generator 10 is connected to the fuel cells 50 to provide the hydrogen gas generated by the hydrolysis reaction to the fuel cells 50. The hydrogen generator 10 will be described in more detail below with reference to FIG. 2.

The oxidizing gas supplying unit 70 supplies the oxidizing gas to the fuel cells 50. The oxidizing gas supplying unit 70 includes a pneumatic pump 71 connected to the fuel cells 50. The pneumatic pump 71 draws air and send the pressurized air to the fuel cells 50.

Figure 2:
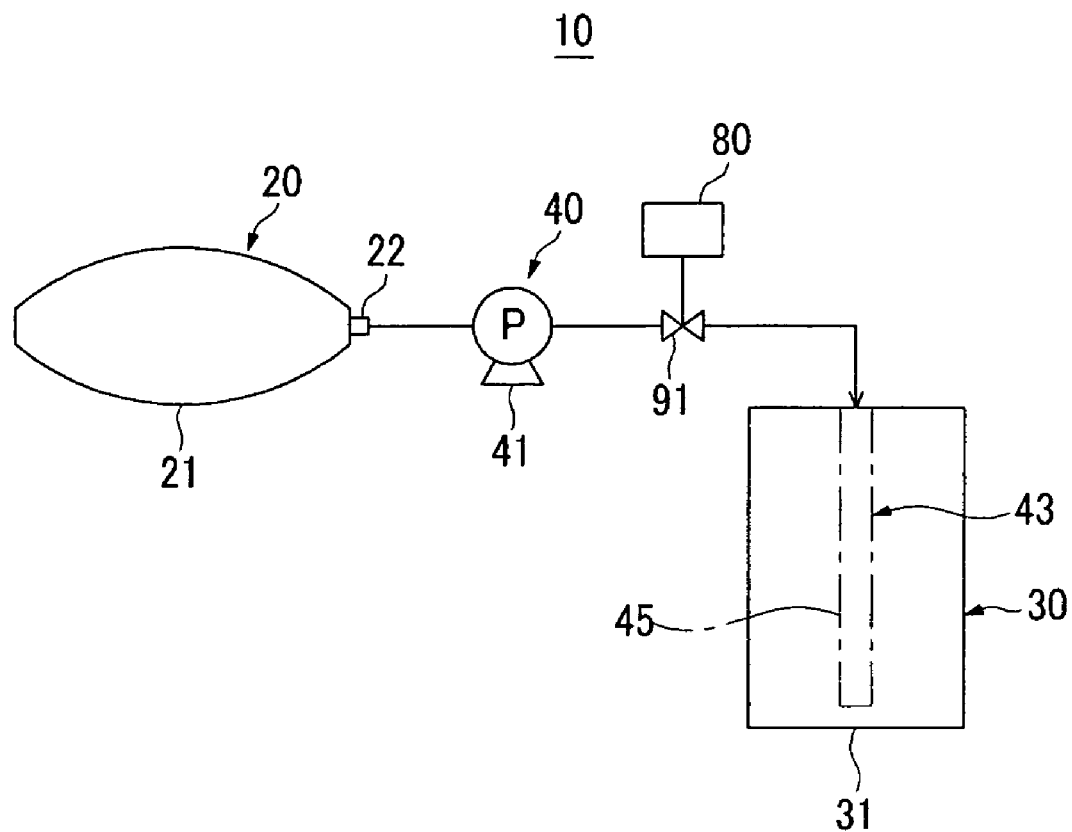
FIG. 2 is a schematic block diagram of a hydrogen generator according to an exemplary embodiment of the present invention.
Figure 3:
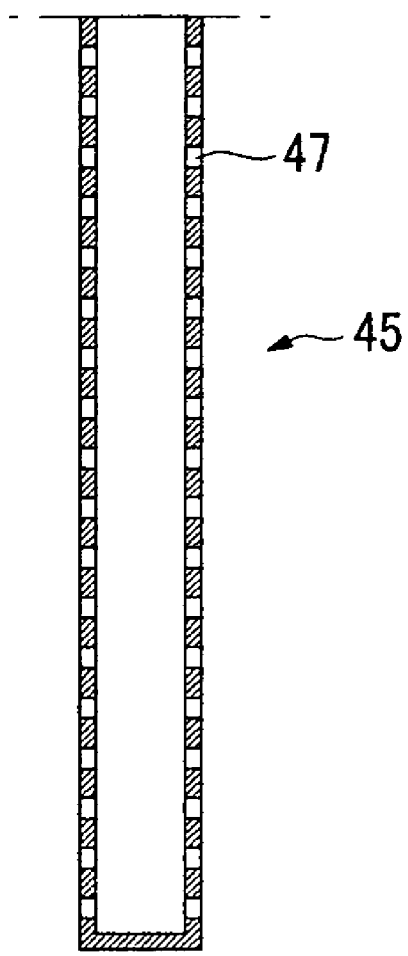
FIG. 3 is a schematic diagram of a spray nozzle of FIG. 2.

FIG. 2 is a schematic block diagram of the hydrogen generator according to an exemplary embodiment of the present invention.

Referring to FIG. 2, the hydrogen generator 10 of the present exemplary embodiment generates hydrogen gas through a hydrolysis reaction between water and the complex metal hydride by supplying the water to a container containing a solid complex metal hydride, and provides the generated hydrogen gas to the fuels cells (50: FIG. 1).

The hydrogen generator 10 includes a water storage container 21 for storing the water, a reaction container 31 for receiving the solid fuel that is a mixture of the complex metal hydride and catalysts, and a water supplying source 40 for supplying the water stored in the water storage container 21 to the reaction container 31.

The water storage container 21 is provided in the form of a pouch that can store a predetermined amount of water. The water storage container 21 may be a water cartridge 20 that can be detachably mounted in the housing (not shown). The water storage container 21 is provided with a water outlet 22 through which the water is discharged. The water outlet 22 is connected to the reaction container 31 by a pipe.

Here, by providing the water storage container 21 in the form of the pouch, the water can be effectively discharged through the water outlet 22 regardless of the orientation of the fuel cell system (100: FIG. 1). Further, since the water storage container is the water cartridge 20, it is convenient to install and replace the water storage container 21.

The reaction container 31 is provided in the form of a fuel cartridge 30 that has a receiving space for receiving the solid fuel that is a mixture of the complex metal hydride and catalysts and is detachably mounted in the housing. The reaction container 31 is connected to the water outlet 22 of the water storage container 21 by the pipe. As the reaction container 31 is provided in the form of the fuel cartridge 30, it is convenient to install and replace the reaction container 31.

The reaction container 31 will be described in more detail below with reference to FIGS. 4 and 5.

The water supplying source 40 includes a pump 41 for forcedly directing the water stored in the water storage container 21 into the reaction container 31. The pump 41 is installed between the water storage container 21 and the reaction container 31.

In the present exemplary embodiment, the water supplying source 40 further includes a sprayer 43 for atomizing the water by spraying the water discharged from the water storage container 21 into the reaction container 31. The sprayer 43 is represented by a dashed dotted line in FIG. 2. That is, as shown in FIG. 2, the sprayer 43 is substantially connected to the pump 41 and is provided with a spray nozzle 45.

The spray nozzle 45 functions to atomize the water by spraying the water that is pumped out from the water storage container 21 by the pump 41. To realize this, the spray nozzle 45 is provided with a plurality of fine holes 47 through which the water is sprayed into the reaction container 31.

The spray nozzle 45 communicates with the pipe line connected to the reaction container 31. The spray nozzle 45 is formed in a pipe shape having a closed end. The spray nozzle 45 is disposed in a height direction of the reaction container 31.

The hydrogen generator 10 is configured to control an amount of hydrogen gas generated by the hydrolysis reaction between the complex metal hydride and the water by controlling an amount of water supplied from the water storage container 21 to the reaction container 31.

To realize this, a valve 91 that can adjust the amount of water supplied to the reaction container 31 through the pipe is installed in the pipe connected between the pump 41 and the reaction container 31. The valve 91 is controlled by a controller 80 to adjust an opening of the pipe. The valve 91 may be a conventional solenoid valve.

Therefore, when the controller 80 sends a control signal to the valve 91, the valve 91 adjusts the opening of the pipe in response to the control signal. That is, the hydrogen generator 10 controls the valve 91 through the controller 80 to control an amount of water supplied to the reaction container 31 for a preset time. According to an embodiment of the present invention, the controller 80 may receive a value of the detected amount of hydrogen generated and send a control signal to the valve 91 according to the detected amount of the generated hydrogen.

As the amount of water supplied to the reaction container 31 is controlled, the amount of hydrogen generated by the hydrolysis reaction between the complex metal hydride and the water can be controlled. That is, since the water is a factor for controlling the hydrogen generation reaction and the hydrolysis reaction between the complex metal hydride and the water is realized according to a stoichiometric ratio, the amount of hydrogen gas generated can be adjusted according to the amount of water.

Figure 4:
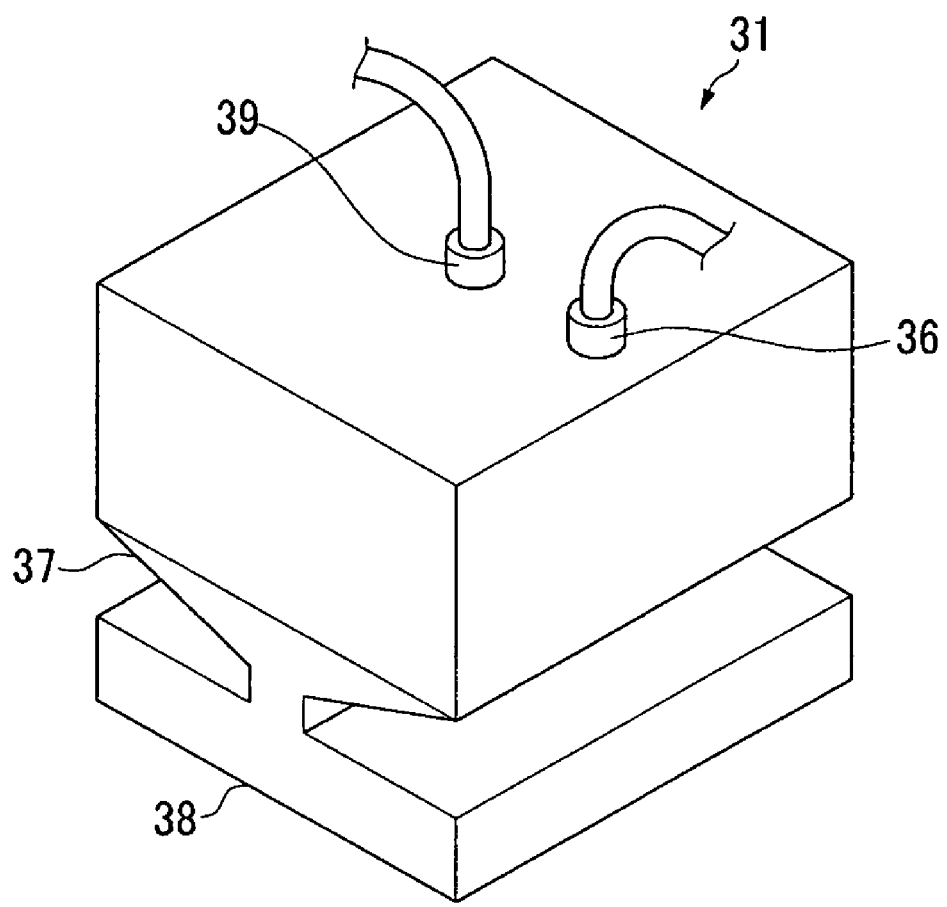
FIG. 4 is a perspective view of a reaction container of FIG. 2.
Figure 5:
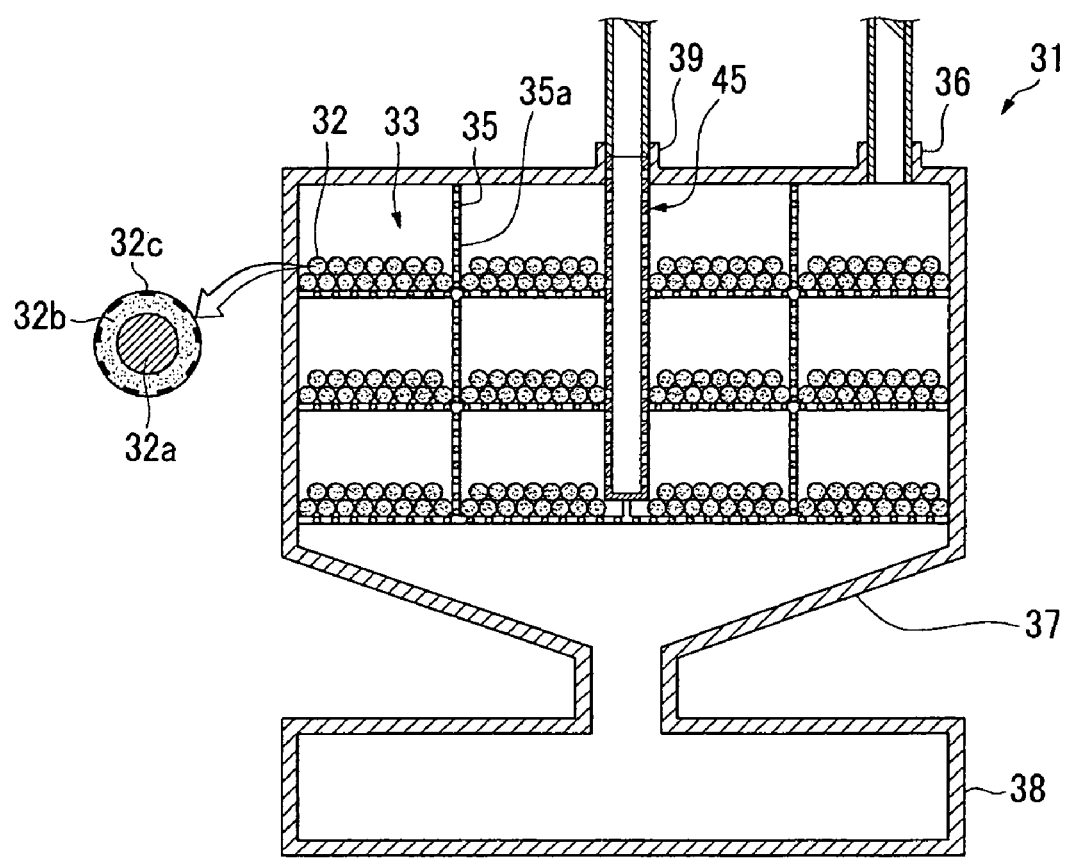
FIG. 5 is a schematic sectional view of FIG. 4.

FIG. 4 is a perspective view of the reaction container of FIG. 2, and FIG. 5 is a sectional view of FIG. 4.

Referring to FIG. 4 and referring to FIG. 5, the reaction container 31 is provided to receive a solid fuel 32 that is a mixture of the complex metal hydride and catalysts. The reaction container 31 is supplied with water from the water supplying source (40: FIG. 2) to generate the hydrogen gas and byproducts by inducing a hydrolysis reaction between the complex metal hydride and the water, and discharges the generated hydrogen gas and the byproducts.

The hydrolysis reaction between the complex metal hydride and the water can be represented as follows:

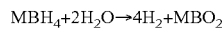

$$MBH_4 + 2H_2O \rightarrow 4H_2 + MBO_2 \qquad \text{[Chemical Formula 1]}$$

In Chemical Equation 1, $MBH_4$ represents metal borohydride as the complex metal hydride, and $MBO_2$ represents metal metaborate as a main component of the byproducts.

Here, M is an alkali metal selected from group 1 (including indium, sodium, and potassium) of the periodic table. In some cases, M may be ammonium or organic matter. B a chemical element selected from group 13 (including boron, aluminum, and gallium) of the periodic table. H is hydrogen.

The complex metal hydride may be, for example, sodium borohydride ($NaBH_4$). However, the present invention is not limited to the above. For example, the complex metal hydride may be selected from the group consisting of $LiBH_4$, $KBH_4$, $NH_4BH_4$, $(CH_3)_4NH_4BH_4$, $NaAlH_4$, $KAlH_4$, $NaGaH_4$, $LiGaH_4$, $KGaH_4$, and combinations thereof. Likewise, the present invention is not limited to these.

When the complex metal hydride is sodium borohydride, a main component of the byproducts is sodium metaborate ($NaBO_2$).

In the present exemplary embodiment, the solid fuel is provided in the form of a plurality of balls received in the reaction container 31. That is, the solid fuel 32 is provided in the formed of pellets each of which includes a spherical core 32a, a coating layer 32b formed of the complex metal hydride and coated on the spherical core 32a, and catalysts 32c dispersed on the coating layer 32b. The spherical core 32a may include at least one of various materials that can be coated with the coating layer 32b and the catalysts 32c and can support them. The spherical core 32a may be porous.

The catalysts 32c function to accelerate the hydrolysis reaction between the complex metal hydride and the water. The catalysts 32c may be formed of a transition metal such as ruthenium, cobalt, nickel, or iron.

The reaction container 31 defines a predetermined volume of receiving space that is divided into a plurality of cells 33 communicating with each other. In this case, the solid fuels 32 are received in the cells 33 and the spray nozzle 45 is arranged in the reaction container 31 in a vertical direction (the height direction of the reaction container).

The cells 33 are arranged in a multilayer structure, and two or more of the cells 33 are disposed on each layer. The cells 33 may be partitioned by a porous mesh member 35. The porous mesh member 35 is provided in the form of a diaphragm provided with a plurality of pores 35a. The porous mesh member 35 may include at least one of various materials that can partition the inside of the reaction container 31 and can support the solid fuel 32.

Here, since the solid fuel 32 is provided in the formed of pellets, the pellets are dispersed in the cells 33 such that some of them can be suspended on the pores 35a of the porous mesh member 35, and they can freely move in each of the cells 33.

As the cells 33 are defined in the receiving space of the reaction container 31 by the porous mesh member 35 provided with the pores 35a, and the solid fuel 32 is dispersed in each of the cells 33, the atomized water can be sprayed to the solid fuel 33 through the spray nozzle 45.

As the solid fuel 32 provided in the form of pellets is received and dispersed in each of the cells 33 defined in the receiving space of the reaction container 31, the byproducts produced by the hydrolysis reaction between the complex metal hydride of the solid fuel 32 and the water in each of the cells 33 can be more effectively discharged, compared with the prior art where a fuel is received in the entire receiving space of the reaction container. Therefore, in the present exemplary embodiment, a phenomenon where an active site of the solid fuel 32 is blocked by the byproducts, i.e., a phenomenon where direction of the water to the solid fuel 32 is interfered with by the byproducts, can be reduced.

The reaction container 31 includes a hydrogen gas outlet 36 and a byproduct outlet 37 through which the hydrogen gas and byproducts that are generated by the hydrolysis reaction between the complex metal hydride and the water are respectively discharged. The reaction container 31 further includes a byproduct storage unit 38 that is connected to the byproduct outlet 37 to store the byproducts discharged through the byproduct outlet 37.

When the complex metal hydride is sodium borohydride ($NaBH_4$), the byproduct is a mixture of sodium metaborate and water. This mixture may be a slurry, a homogeneous solution, or a heterogeneous mixture.

The hydrogen gas outlet 36 is connected to the fuel cells (50: FIG. 1) through a pipe.

The byproduct outlet 37 is integrally formed with the reaction container 31 and communicates with the receiving space of the reaction container 31. The byproduct outlet 37 is formed in a funnel shape so as to collect the byproducts produced by the hydrolysis reaction between the complex metal hydride of the solid fuel 32 and the water in the cells 33 and a water mixture remaining after the hydrolysis reaction and to allow the collected byproducts and the water mixture to flow to the byproduct storage unit 38 by gravity.

The byproduct storage unit 38 is integrally formed with the byproduct outlet 37 to collect and store the byproducts and water mixture discharged through the byproduct outlet 37.

Reference numeral 39 indicates a water inlet through which the water is supplied to the reaction container 31.

The following will describe an operation of the fuel cell system and a method for generating hydrogen in the above-described hydrogen generator in more detail.

First, the water stored in the water is discharged through the water outlet 22 by pumping pressure of the pump 41 and is directed to the spray nozzle 45 disposed in the reaction container 31.

At this point, the valve 91 is controlled by the controller 80 to adjust the opening of the pipe and thus adjust an amount of water directed to the spray nozzle 45.

Subsequently, the spray nozzle 45 sprays the water through the fine holes 47 so that the water can be atomized. Then, the atomized water is dispersed into the cells 33 to contact the solid fuel 32 received in the cells 33.

At this point, since the cells 33 are defined by the porous mesh member 35 provided with the pores 35a in the receiving space of the reaction container 31 and the solid fuel 32 is dispersed and received in the cells 33, the atomized water sprayed by the spray nozzle 45 can uniformly contact the solid fuel 32.

Accordingly, the hydrolysis reaction between the complex metal hydride (e.g., sodium borohydride ($NaBH_4$)) of the solid fuel 32 and the water in the cells 33 is accelerated by the catalysts 32c, in the course of which the hydrogen gas and byproducts such as sodium metaborate ($NaBO_2$) are produced.

It is noted that the hydrogen gas produced by using the sodium borohydride has high purity without impurities containing carbon, and high humidity. That is, a gas stream generated by the sodium borohydride contains no carbon monoxide. This property is very important when considering that most fuel cells, particularly a polymer electrolyte membrane fuel cell, require high quality hydrogen gas and the carbon monoxide deteriorates the catalytic action of the fuel cell to cause malfunctioning of the fuel cells.

The amount of water supplied to the spray nozzle 45 can be adjusted by the valve 91. Therefore, an amount of hydrogen gas generated by the hydrolysis reaction between the complex metal hydride can be adjusted in accordance with the amount of water supplied.

Next, the hydrogen gas is discharged through the hydrogen gas outlet 36 and subsequently supplied to the fuel cells 50 through the pipe.

At this same time, the byproducts flow down through the pores 35a of the mesh member 35 defining the cells 33, and are discharged through the byproduct outlet 37 and stored in the byproduct storage unit 38. In this case, in the present exemplary embodiment, since the solid fuel 32 provided in the form of pellets is dispersed and received in the cells 33 defined in the receiving space of the reaction container 31, the byproducts can be more effectively discharged.

During the above-described process, the inner temperature of the reaction container 31 is maintained at 40-70° C. considering a heat generation property of the hydrolysis reaction. The temperature range is a range where the byproducts generated by the hydrolysis reaction between the complex metal hydride and the water can be easily separated from the solid fuel 32 and flow down to the byproduct outlet 37.

During the process of supplying the hydrogen gas to the fuel cells 50, the oxidizing gas supplying unit 70 draws air and supplies the air to the fuel cells 50. Then, the fuel cells 50 generate a predetermined amount of electrical energy by an electrochemical reaction between the hydrogen gas and the oxidizing gas.

Figure 6:
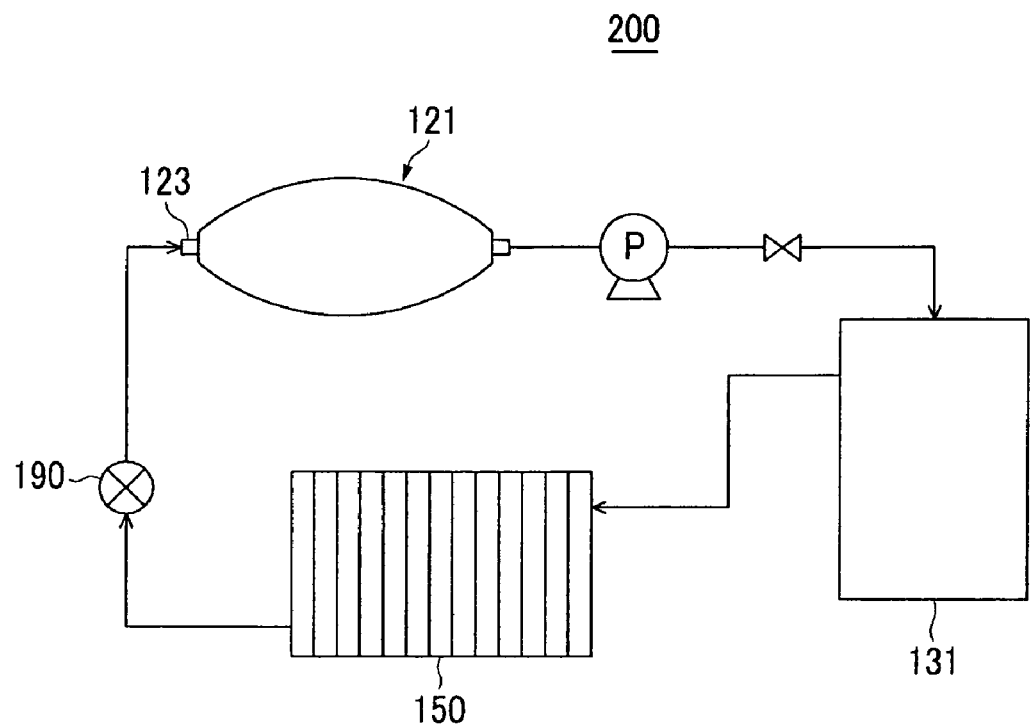
FIG. 6 is a schematic block diagram of a fuel cell system according to another exemplary embodiment of the present invention.

FIG. 6 is a block diagram of a fuel cell system according to another exemplary embodiment of the present invention.

Referring to FIG. 6, a fuel cell system 200 of the present exemplary embodiment is basically identical to the fuel cell system of the foregoing exemplary embodiment except that steam discharged from the fuel cells 150 which receives hydrogen from the reaction container 131 is condensed into water and the condensed water is supplied to a water storage container 121.

The fuel cells 150 exhaust high temperature steam generated by a reduction reaction of the oxidizing gas in the course of generating the electrical energy by the oxidation reaction of the hydrogen gas and the reduction reaction of the oxidizing gas supplied by an oxidizing gas supplying unit (e.g., a pump 171).

Therefore, the fuel cell system 200 of the present exemplary embodiment includes a condenser 190 for condensing the steam exhausted from the fuel cells 150. The condenser 190 is connected between the water storage container 121 and the fuel cells 150 by pipes.

In addition, the water storage container 121 is provided with a water inlet 123 through which the water condensed by the condenser 190 is injected. The water inlet 123 is connected to the condenser 190 by the pipe.

Therefore, the steam exhausted from the fuel cells 150 is condensed into water by the condenser 190 and the water is supplied to the water storage container 121 so that the water can be reused for generating the hydrogen. Unlike the prior art, the concentration of the complex metal hydride and the concentration of the catalysts are not varied.

Other structures and operations of the fuel cell system 200 of the present exemplary embodiment are the same as those of the fuel cell system of the foregoing embodiment, so a detailed description thereof will be omitted herein.

According to the exemplary embodiments, hydrogen gas is generated through a hydrolysis reaction between a complex metal hydride and water by supplying the water to a reaction container receiving a solid fuel that is a mixture of a complex metal hydride and catalysts. By controlling the amount of water supplied to the reaction container, the amount of hydrogen gas generated can be adjusted.

Further, since the solid fuel is provided in the form of pellets and disposed and received in the cells defined in the receiving space of the reaction container, the byproducts produced by the hydrolysis reaction between the complex metal hydride and the water in the cells can be effectively discharged. Therefore, a phenomenon in which an active site of the solid fuel is blocked by the byproducts can be reduced and thus the use of the fuel can be improved.

Furthermore, since the water discharged from the fuel cell can be reused, the performance of the fuel cell system can be improved without varying the concentration of the fuel or the concentration of the catalysts.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A fuel cell system comprising:
   a hydrogen generator for generating hydrogen gas, the hydrogen generator comprising:
      a water storage container for storing water;
      a reaction container including a plurality of cells, the cells being partitioned by a mesh member having a plurality of pores, each of the cells containing a solid fuel comprising a complex metal hydride and catalysts, the mesh member supporting the solid fuel; and
      a water supplying source connected between the water storage container and the reaction container to supply the water to the reaction container; and
   a fuel cell generating electrical energy by using the hydrogen gas and an oxidizing gas.

2. The fuel cell system of claim 1, wherein the cells are arranged in a multilayer structure.

3. The fuel cell system of claim 1, wherein the solid fuel is in the form of a pellet.

4. The fuel cell system of claim 1, wherein the solid fuel comprises a spherical core and a coating layer formed on the spherical core, the coating layer including the complex metal hydride, the catalysts dispersed on the coating layer.

5. The fuel cell system of claim 1, wherein the reaction container includes a byproduct storage unit to store byproducts produced from the reaction of the water and the complex metal hydride.

6. The fuel cell system of claim 1, wherein the water storage container is in the form of a pouch.

7. The fuel cell system of claim 1, wherein the water storage container is a water cartridge.

8. The fuel cell system of claim 1, further comprising a pump connected to the water storage container to pressurize and supply the water into the reaction container.

9. The fuel cell system of claim 8, wherein the water supplying source comprises a sprayer connected to the pump to spray the water into the reaction container in an atomized state.

10. The fuel cell system of claim 1, wherein the complex metal hydride is sodium borohydride ($NaBH_4$).

11. The fuel cell system of claim 1, further comprising a controller controlling an amount of the generated hydrogen gas by adjusting an amount of the water supplied.

12. A fuel cell system comprising:
    a hydrogen generator for generating hydrogen gas, the hydrogen generator comprising:
       a water storage container for storing water;
       a reaction container having a plurality of cells defined by a plurality of porous mesh members, each of the cells containing a solid fuel including a complex metal hydride, the mesh member supporting the solid fuel; and
       a water supplying source connected between the water storage container and the reaction container to supply the water to the reaction container, the water supplying source comprising a sprayer to spray the water into the reaction container; and
    at least one fuel cell generating electrical energy using the hydrogen gas and an oxidizing gas.

13. The fuel cell system of claim 12, wherein the solid fuel is in a form of a pellet comprising a spherical core and a coating layer formed on the spherical core, the coating layer including the complex metal hydride, catalysts dispersed on the coating layer.

14. The fuel cell system of claim 12, wherein the sprayer is mounted into the reaction container in a vertical direction, and the reaction container has a funnel shape in the bottom of the reaction container.

15. The fuel cell system of claim 14, wherein the reaction container further includes a byproduct storage unit connected to the bottom of the reaction container.

16. The fuel cell system of claim 12, further comprising a controller controlling an amount of the hydrogen gas by adjusting an amount of the water supplied.

17. A fuel cell system comprising:
    a hydrogen generator for generating hydrogen gas, the hydrogen generator comprising:
       a water storage container for storing water;
       a reaction container having a plurality of cells defined by a plurality of porous mesh members, each of the cells containing a solid fuel comprising a reactant and catalysts, the mesh member supporting the solid fuel, a hydrogen gas being generated through a reaction between the reactant and the water; and
       a water supplying source connected between the water storage container and the reaction container to supply the water to the reaction container, the water supplying source comprising a sprayer to spray the water into the reaction container;
    at least one fuel cell generating electrical energy using the hydrogen gas and an oxidizing gas; and
    an oxidizing gas supplier supplying the oxidizing gas to said at least one fuel cell.

18. The fuel cell system of claim 17, further comprising a condenser connected between said at least one fuel cell and the water storage container to condense steam discharged from the fuel cells into water and supply the condensed water to the water storage container.

19. The fuel cell system of claim 18, wherein the hydrogen generator further comprises a controller controlling an amount of the hydrogen gas by adjusting an amount of the water supplied.

20. The fuel cell system of claim 17, wherein the solid fuel comprises a spherical core and a coating layer formed on the spherical core, the coating layer including the reactant, the catalysts dispersed on the coating layer, the reactant including a complex metal hydride.

21. The fuel cell system of claim 17, wherein the sprayer is mounted into the reaction container in a vertical direction, and the reaction container has a funnel shape in the bottom of the reaction container.

22. The fuel cell system of claim 21, wherein the reaction container further includes a byproduct storage unit connected to the bottom of the reaction container.

* * * * *